(12) United States Patent
Yan et al.

(10) Patent No.: US 11,986,968 B2
(45) Date of Patent: May 21, 2024

(54) REAL-TIME CONTROL SYSTEM FOR INDUSTRIAL ROBOT BASED ON VIRTUAL REALITY (VR)

(71) Applicant: Harbin Institute of Technology, Harbin (CN)

(72) Inventors: Jihong Yan, Harbin (CN); Yuemin Chen, Harbin (CN); Pengxiang Wang, Harbin (CN)

(73) Assignee: Harbin Institute of Technology, Harbin (CN)

( * ) Notice: Subject to any disclaimer, the term of this patent is extended or adjusted under 35 U.S.C. 154(b) by 203 days.

(21) Appl. No.: 17/694,836

(22) Filed: Mar. 15, 2022

(65) Prior Publication Data

US 2022/0203550 A1    Jun. 30, 2022

(30) Foreign Application Priority Data

Mar. 15, 2021    (CN) .......................... 202110275363.6

(51) Int. Cl.
*B25J 9/00*    (2006.01)
*B25J 9/16*    (2006.01)
*G06T 19/00*   (2011.01)

(52) U.S. Cl.
CPC .......... *B25J 9/1697* (2013.01); *B25J 9/1612* (2013.01); *B25J 9/1664* (2013.01); *B25J 9/1671* (2013.01); *G06T 19/006* (2013.01)

(58) Field of Classification Search
CPC ...... B25J 9/1697; B25J 9/1612; B25J 9/1664; B25J 9/1671; B25J 9/1689; G06T 19/006; G05B 2219/39451; G05B 19/0428; G05B 2219/24024
See application file for complete search history.

(56) References Cited

U.S. PATENT DOCUMENTS 9,643,314 B2 *    5/2017    Guerin ................... B25J 9/1671
2016/0257000 A1 *    9/2016    Guerin ................... B25J 9/1671

FOREIGN PATENT DOCUMENTS

| CN | 1991845    A | 7/2007  |
| CN | 101920233  A | 12/2010 |
| CN | 107263473  A | 10/2017 |
| CN | 107610579  A | 1/2018  |

(Continued)

OTHER PUBLICATIONS

Ding Guofu, et al.Based on WTK virtual environment modeling, "Material handling machinery remote operation theory and simulation based on virtual reality". 2007.pp. 116-120.

*Primary Examiner* — Ian Jen

(57) ABSTRACT

A real-time control system for industrial robots based on virtual reality (VR), including: a VR headset, a VR controller, a model construction module, a motion control module, a data communication system and a robot controller. Through the VR controller, a user can touch and drag an end of the gripper to move the robot in the Cyber environment. When the gripper moves into a bounding box of a control point, the data communication system is triggered, and a communication code corresponding to the control point is sent to the robot controller via a Unity engine script. After receiving the code, the robot controller sends the corresponding motion command such that the robot such that the robot moves in real time according to the control data.

10 Claims, 4 Drawing Sheets

(56) References Cited

FOREIGN PATENT DOCUMENTS

| CN | 109213306 A | 1/2019 |
|---|---|---|
| CN | 109262609 A | 1/2019 |
| CN | 110064200 A | 7/2019 |
| CN | 110977931 A | 4/2020 |

\* cited by examiner

REAL-TIME CONTROL SYSTEM FOR INDUSTRIAL ROBOT BASED ON VIRTUAL REALITY (VR)

CROSS-REFERENCE TO RELATED APPLICATIONS

This application claims the benefit of priority from Chinese Patent Application No. 202110275363.6, filed on Mar. 15, 2021. The content of the aforementioned application, including any intervening amendments thereto, is incorporated herein by reference.

TECHNICAL FIELD

This application relates to industrial robot control systems, in particular to a real-time control system for an industrial robot based on virtual reality (VR).

BACKGROUND

The industrial robot has been used broadly in various links in the manufacturing industry, such as production, logistics, and high-risk environmental operation and control, which is essential for the automatic and intelligent manufacturing.

The application range of the industrial robot has been increasingly broadened. Considering the high technical integration, complex application environment and professional operation and maintenance of the industrial robot, its operation and control require high-tech and multi-dimensional applied talents; however, there is still a serious shortage of such competent talents. Other than the personnel training, the design and interaction of the industrial robot control are also critical.

To cope with the high technical integration, complex application environment, and professional operations of the industrial robot, VR, which is an emerging technology integrating immersion, interaction, and imagination, is developed. The VR technology has achieved rapid advancement in recent years, and has been widely recognized in many industries (i.e., medical, transportation, education, entertainment, and military) due to its intuitive interaction, and immersive experience that is not limited by the application environment.

Currently, the VR-based robot control mainly focuses on the motion control of unmanned aerial vehicles or automated guided vehicles. Regarding the existing VR control system for the industrial robots, the path planning and collision detection are performed through the digital simulation environment of VR, and then the motion command set is sent to the industrial robot in the physical space to control the industrial robot. In the practical application, this control system cannot achieve the real-time control of the industrial robot. Moreover, the planning and compilation process of the command set also increases the difficulty of interaction between operators and the control system, failing to fundamentally optimize the human-machine cooperation.

SUMMARY

To overcome the above-mentioned deficiencies in the prior art that fails to enable the real-time control of industrial robots, this disclosure provides a real-time control system for an industrial robot based on virtual reality (VR) technology.

Technical solutions of this application are specifically described as follows.

The disclosure provides a real-time control system for an industrial robot based on virtual reality (VR), comprising:
a VR integrated machine;
a model construction module;
a motion control module;
a data communication system; and
a robot controller;
wherein the VR integrated machine comprises a VR headset and a VR controller;
the model construction module is configured to construct an industrial robot model and a workspace model of the industrial robot;
the motion control module is configured to construct a Cyber model corresponding to the industrial robot model and the workspace model of the industrial robot;
arrange a plurality of control points in the Cyber model, and set a first bounding box for each of the plurality of control points such that first bounding boxes respectively corresponding to the plurality of control points cover an entire workspace of the industrial robot in the Cyber model;
set a second bounding box and a VR interactive component that displays a highlighted and grasp option on a gripper of the industrial robot in the Cyber model, and associate the VR interactive component with the VR controller;
set a camera component in the Cyber model, and associate the camera component with the VR headset; and
receive a trigger signal sent by the VR controller and send a corresponding motion command;
the VR headset is configured to image the industrial robot and the Cyber model in the VR headset through the camera component when headset turned on to enter a working mode;
the VR controller is configured to touch the second bounding box when the VR headset enters the working mode to activate the highlighted and grasp option in the VR interactive component, so as to drag the gripper of the industrial robot in the Cyber model to move to a certain control point in the workspace of the industrial robot, and send a corresponding trigger signal to the motion control module; and
the robot controller is configured to preset a plurality of control data; motion commands of the plurality of control points respectively corresponds to the plurality of control data; and when the data communication system receives a motion command sent by the motion control module, the industrial robot is controlled to move by a control data corresponding to the motion command; and
the robot controller is also configured to set a plurality of mesh control points at an equal interval in the Cyber model.

In some embodiments, the model construction module further comprises a display module; and the display module is configured to display a real-time movement position information of the industrial robot in the VR headset.

In some embodiments, the data communication system comprises a data sending module, an initialization module and a control point judgment module;
the data sending module is configured to send a communication code when receiving a signal that a control point is triggered;

the initialization module is configured to send a login communication code command when receiving the signal that a control point is triggered;

the control point judgment module is configured to receive the login communication code command, scan the plurality of control points until detecting that the gripper of the industrial robot moves into a bounding box of a control point and send a communication code corresponding to the control point; and the data sending module is configured to send the communication code corresponding to the control point to the robot controller to trigger a control data corresponding to the control point such that the robot controller controls the industrial robot to move according to the control data.

In some embodiments, each of the plurality of control data comprises a control point coordinate, a movement speed of the industrial robot, a movement acceleration of the industrial robot, and a movement mode of the industrial robot.

In some embodiments, the model construction module comprises an industrial robot drawing unit, a three-dimensional (3D) model construction unit, and a workspace construction unit;

the industrial robot drawing unit is configured to draw geometric features of the industrial robot using a Solidworks software to obtain an industrial robot drawing, and import the industrial robot drawing into the 3D model construction unit;

the 3D model construction unit is configured to create a 3D image of the industrial robot based on the industrial robot drawing to render a surface material of the 3D image identical to that of the industrial robot; and adjust a center of each joint axis of the 3D image of the industrial robot to obtain an adjusted 3D model as an industrial robot model; and the workspace construction unit is configured to construct a workspace model of the industrial robot according to a physical workspace of the industrial robot.

In some embodiments, in the motion control module, the Cyber model is constructed by using a Cyber model construction unit;

the Cyber model construction unit is configured to construct an empty Cyber model using an Unity3D engine; import the industrial robot model and the workspace model of the industrial robot into the empty Cyber model to form the Cyber model; and introduce a rigid body and a hinge component to each joint axis of the industrial robot in the Cyber model to render a motion of the industrial robot in the Cyber model consistent with that of the industrial robot in a real space.

In some embodiments, the rigid body has a mass coefficient of 1, a resistance coefficient of 15, and an angular resistance coefficient of 25.

In some embodiments, reticulate control points are equidistantly arranged in the Cyber model.

In some embodiments, the industrial robot is a six-degree-of-freedom serial industrial robot.

In some embodiments, a model of the six-degree-of-freedom tandem industrial robot is EpsonC4.

In some embodiments, a model of the robot controller is EpsonC4RC700.

Compared with the prior art, the beneficial effects of the present disclosure are described below.

In the control system provided herein, the VR headset is connected to a host computer, which is in communication with the robot controller through the data communication system. When the Cyber model established based on the Unity3D engine is started, the user can see the industrial robot and its surrounding environment consistent with the physical environment due to the association of the Cyber model and the VR headset camera. The user touches and drags an end of the gripper of the industrial robot through the VR controller to realize the movement of the industrial robot in the Cyber environment. When the gripper moves to the inside of the bounding box of a certain control point, the data communication system is triggered, and the Unity engine script sends the communication code corresponding to the control point to the robot controller. After receiving the code, the robot controller sends a command to the industrial robot body in the physical space to trigger the control data corresponding to the control point in the robot controller, so as to control the industrial robot to move in real time according to the control data. By means of the VR technology, trigger the desired control data can be triggered by touching the corresponding control point by the VR controller, so as to control the industrial robot body to move according to the control data. The control system provided herein realizes the real-time, efficient and visible control for the industrial robot.

This application realizes the real-time control of the industrial robot based on VR technology in an intuitive and easy interaction manner, making the control process of the industrial robot get rid of the dependence on the programming and debugging procedures on the industrial computer. The user only needs to drag the gripper of the industrial robot in the Cyber model in the VR environment to realize the real-time control of the motion of the industrial robot in the physical environment.

At the same time, computer-aided design software is employed herein to generate a model and associate the generated model with the VR headset camera, which makes the running of the Cyber model free of restriction by the network environment, and simplifies the hardware configuration of the entire control system.

This application solves the problems of complex operation and difficult personnel training in the application of industrial robots. It not only realizes the remote real-time control of the industrial robot, but also makes the motion planning of the industrial robot more convenient. Moreover, it also brings enhanced human-machine collaboration efficiency and simple and flexible operation, having a high practical application value.

DETAILED DESCRIPTION OF EMBODIMENTS

Embodiment 1

Figure 1:
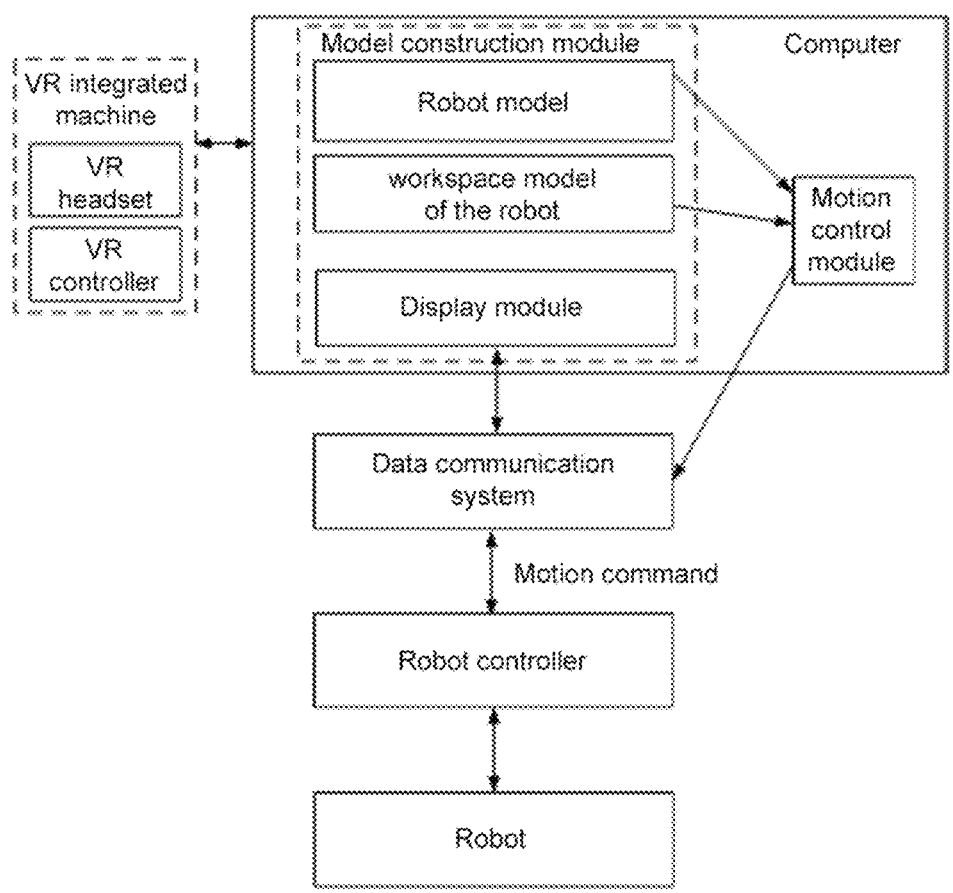
FIG. 1 is a schematic diagram of a real-time control system of an industrial robot based on VR according to an embodiment of the present disclosure.
Figure 2:
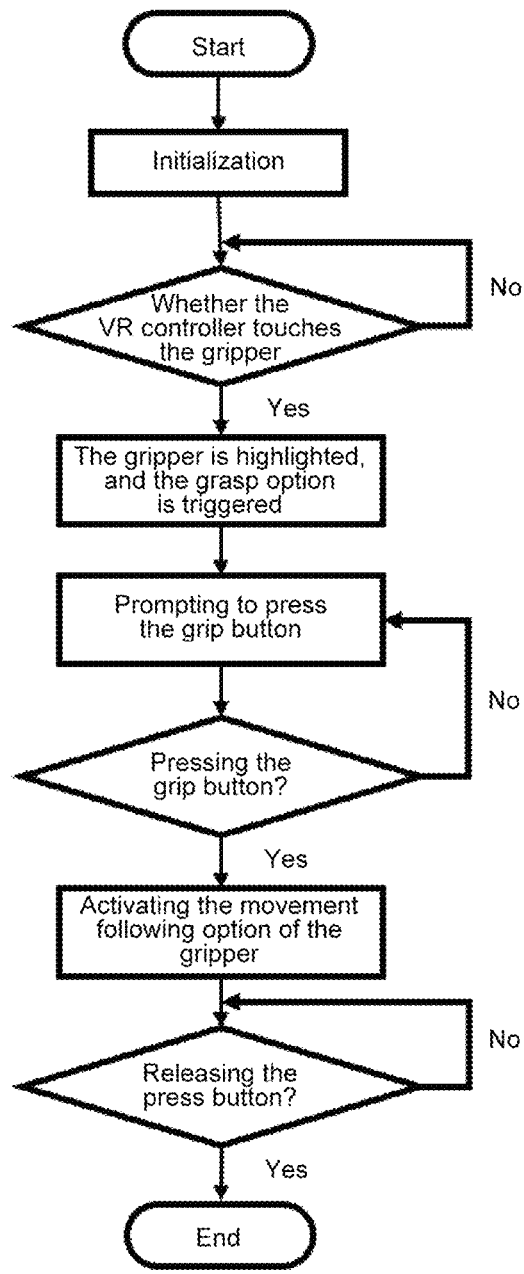
FIG. 2 is a flowchart illustrating an interaction between a Cyber model and a VR headset camera according to an embodiment of the present disclosure.

Referring to FIGS. 1-4, a real-time control system for an industrial robot based on virtual reality (VR) technology is provided, which includes a VR integrated machine, a model construction module, a motion control module, a data communication system, and a robot controller.

The VR integrated machine includes a VR headset and a VR controller.

The model construction module is configured to construct an industrial robot model and a workspace model of the industrial robot;

the motion control module is configured to construct a Cyber model corresponding to the industrial robot model and the workspace model of the industrial robot;

arrange a plurality of control points in the Cyber model, and set a first bounding box for each of the plurality of control points such that the first bounding box respectively corresponding to the plurality of control points cover an entire workspace of the industrial robot in the Cyber model;

set a second bounding box and a VR interactive component that displays a highlighted and grasp option on a gripper of the industrial robot in the Cyber model, and associate the VR interactive component with the VR controller;

set a camera component in the Cyber model, and associate the camera component with the VR headset; and receive a trigger signal sent by the VR controller and send a corresponding motion command.

The VR headset is configured to image the industrial robot and the Cyber model in the VR headset through the camera component when the VR headset is turned on to enter a working mode.

The VR controller is configured to touch the second bounding box on the robotic gripper in the Cyber model when the VR headset enters the working mode to activate the highlighted and grasp option in the VR interactive component, so as to drag the gripper of the industrial robot in the Cyber model to move to a certain control point in the workspace of the industrial robot, and send a corresponding trigger signal to the motion control module.

The robot controller is configured to preset a plurality of control data. Motion commands of the plurality of control points respectively corresponds to the plurality of control data. When the data communication system receives a motion command sent by the motion control module, the industrial robot is controlled to move by a control data corresponding to the motion command.

In this embodiment, a computer is used to edit relevant control data for all the plurality of control points to synchronize to the robot controller from the computer control software, and finally the robot control mode is switched to the remote-control mode.

In the real-time control system provided herein, the Cyber model is constructed according to the industrial robot model and the workspace model of the industrial robot such that the Cyber model is closer to the real industrial robot and workspace of the industrial robot.

The real-time control system provided herein further includes two base stations. The two base stations are fixed on the outside of the VR integrated machine (on the wall or supported by a bracket). After the two base stations are arranged relative to each other, a cuboid projection area will be thus formed. Within the cuboid projection area, it will interact with the VR environment to present the image of the industrial robot and the workspace of the industrial robot in the VR headset.

Figure 3:
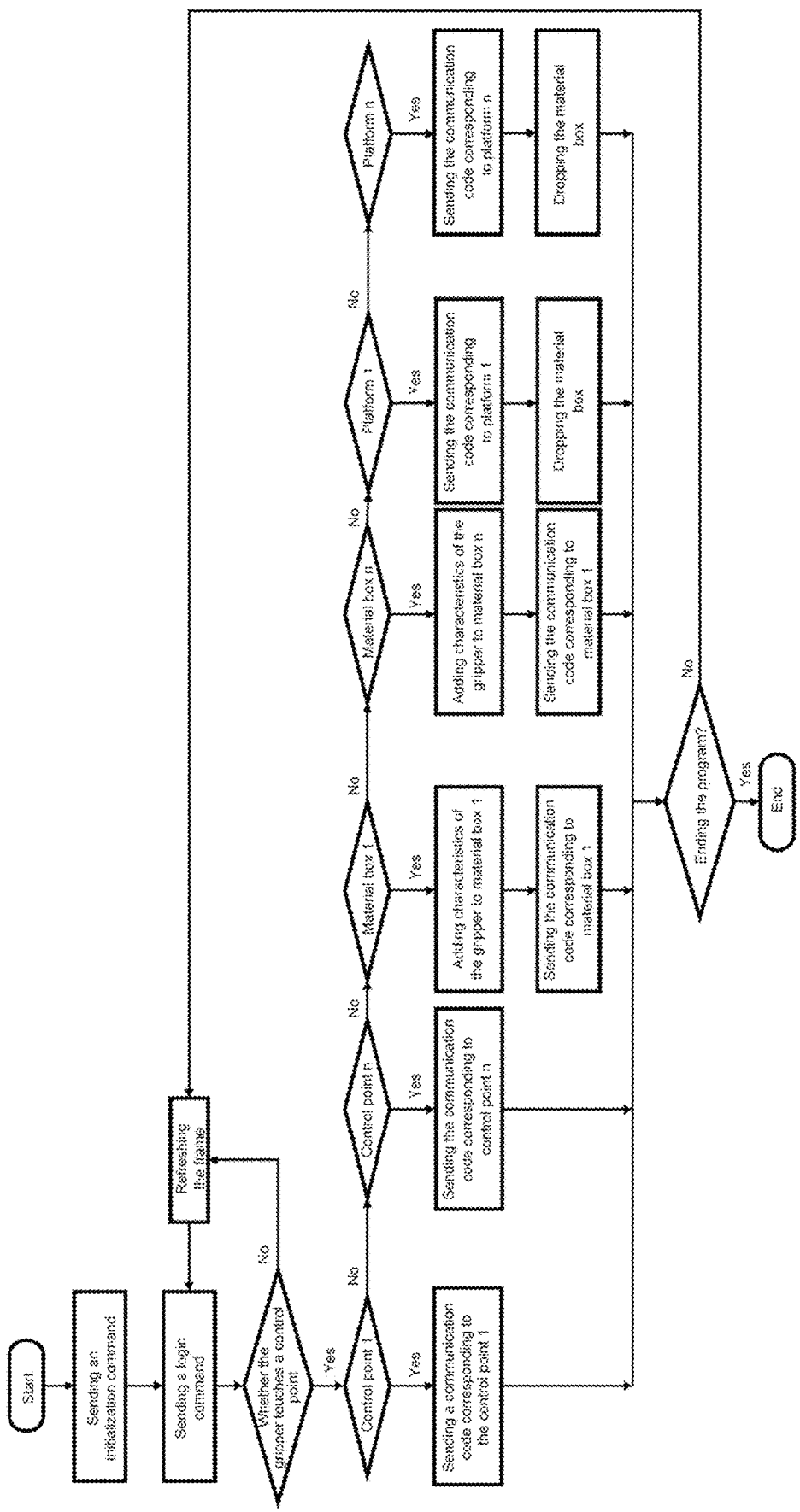
FIG. 3 is a flow chart showing identification process of the control point according to an embodiment of the present disclosure.
Figure 4:
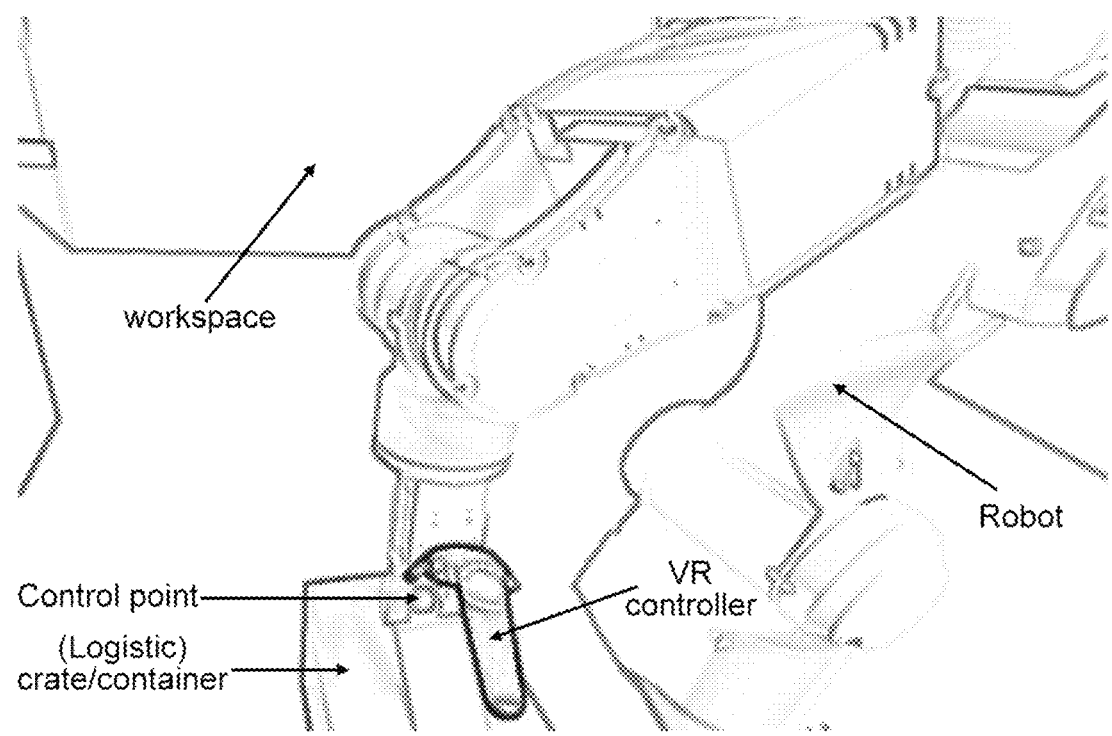
FIG. 4 shows a perspective of a VR headset according to an embodiment of the present disclosure.

The material box in FIG. 3 is what the industrial robot needs to grip during working.

Embodiment 2

Based on the real-time control system according to EMBODIMENT 1, the model construction module further includes a display module.

The display module is configured to display a real-time movement position information of the industrial robot in the VR headset.

Embodiment 3

Based on the real-time control system according to EMBODIMENT 1, the data communication system includes a data sending module, an initialization module and a control point judgment module.

The data sending module is configured to send a communication code when receiving a signal that a control point is triggered.

The initialization module is configured to send a login communication code command when receiving the signal that a control point is triggered.

The control point judgment module is configured to receive the login communication code command, scan the plurality of control points until detecting that the gripper of the industrial robot moves into a bounding box of a control point and send a communication code corresponding to the control point.

The data sending module is configured to send the communication code corresponding to the control point to the robot controller to trigger a control data corresponding to the control point such that the robot controller controls the industrial robot to move according to the control data.

Embodiment 4

Based on the real-time control system according to EMBODIMENT 1, each of the plurality of control data includes a control point coordinate, a movement speed of the industrial robot, a movement acceleration of the industrial robot, and a movement mode of the industrial robot.

Embodiment 5

Based on the real-time control system according to EMBODIMENT 1, the model construction module includes an industrial robot drawing unit, a three-dimensional (3D) model construction unit and a workspace construction unit.

The industrial robot drawing unit is configured to draw geometric features of the industrial robot using a Solidworks software to obtain an industrial robot drawing, and import the industrial robot drawing into the 3D model construction unit.

The 3D model construction unit is configured to create a 3D image of the industrial robot based on the industrial robot drawing to render a surface material of the 3D image identical to that of the industrial robot, and adjust a center of each joint axis of the 3D image of the industrial robot to obtain an adjusted 3D model of the industrial robot as an industrial robot model.

The workspace construction unit is configured to construct an industrial robot workspace model of the industrial robot according to a physical workspace of the real industrial robot.

Embodiment 6

Based on the real-time control system according to EMBODIMENT 5, in the motion control module, the Cyber model is constructed by using a Cyber model construction unit.

The Cyber model construction unit is configured to construct an empty Cyber model using an Unity3D engine;

import the industrial robot model and the workspace model of the industrial robot into the empty Cyber model to form the Cyber model; and introduce a rigid body and a hinge component to each joint axis of the industrial robot in the Cyber model to render a motion of the industrial robot in the Cyber model consistent with that of the industrial robot in a real space.

In this embodiment, the center of each joint axis of the industrial robot is adjusted to ensure that no motion error occurs after assembly in the final operating platform, and the adjusted model version is compatible with the Unity3D engine, preparing for the Unity3D modeling. Finally, the scene camera is associated with the VR headset camera, and the designed 3D model of the industrial robot and its environment is imported to complete the scene arrangement of the Cyber model according to the corresponding relationship of the physical scene.

The Cyber model is constructed through the following steps. The basic profile of the target industrial robot is measured to model the target industrial robot by using the Solidworks software. Through the drawing and the 3D model of the target industrial robot obtained based on relevant feature information of the target industrial robot, the Cyber model of each joint axis of the target industrial robot is formed and exported in the IGS format. Environmental models related to the target industrial robot, such as workbenches, material boxes, are modeled and exported in the same way.

The models in the IGS format established by the Solidworks software are imported into the 3dsMax software, and endow them a surface effect similar to that of the physical surface material. To ensure the compatibility of the material effect and the operating platform, the Cyber model requires a rendering that meets the requirements the Unity engine. At the same time, to facilitate the control of the Cyber model in the Unity engine, the axis of each joint axis of the industrial robot needs to be adjusted after the 3D model is imported into the 3dsMax software to ensure that no movement occurs after assembly in the final operating platform. After the rendering is completed, the files are exported in the FBX format.

The Unity3D engine is used to establish the Cyber model, and the platform version of the Unity3D engine is Unity2019.1.10f1. An empty scene is created in the project file to associate the main camera of the scene with the VR headset camera (HTC Vive Pro), and import the model into the Assets folder. The rigid body and hinge component are added to each joint axis of the industrial robot, and the mass, resistance, and angular resistance in the rigid body and hinge component are preset to limit the joint rotation range in the rigid body and hinge component. To make the motion of the industrial robot consistent with the real industrial robot, the rigid body has a mass coefficient of 1, a resistance coefficient of 15, and an angular resistance coefficient of 25. After the assembly is completed, models such as workbenches and material boxes are imported to complete the scene arrangement.

The motion control module described herein maps the workspace of the industrial robot to the Cyber model established by the Unity3D software, and creates a VR interaction mechanism in the Cyber model.

A coordinate system is established with the center of the industrial robot base contacting the ground as the origin, and the coordinate system in the physical space is transformed with a coordinate system in Unity to complete the mapping. Based on the coordinate system in Unity, reticulate control points are equidistantly arranged in the Cyber model, and a bounding box is created. The volume of the bounding box is the product of the spacing value between adjacent control points, enabling the bounding box to cover the workspace of the industrial robot.

A control software EPSON RC+7.0 carried by the robot controller EpsonC4 is used to plan the relevant control data of the control point, including a coordinate of a control point, a movement speed of the industrial robot, a movement acceleration of the industrial robot, and a movement mode of the industrial robot. The relevant control data is passed through the I/O interface of the robot controller to be synchronized from the host computer to the robot controller, and the robot control mode is switched to the remote-control mode.

A bounding box and a VR interactive component are added to an end of the gripper of the industrial robot to create a VRTK interactive element component, in which touch highlight responses and grip buttons are set. When the VR controller is in contact with the bounding box, the gripper of the industrial robot changes color and is highlighted, and the grasp option is triggered. At this time, the end of the gripper of the industrial robot can be dragged by pressing any one of the grip buttons to move the industrial robot within the working range.

The data communication system described herein uses the bounding box of the control point as the trigger condition to send relevant control data to the robot controller. In Visual Studio 2013, the C# language is employed to write the communication script between the Cyber model and the robot controller, and add the script to the trigger control point of the end of the robotic gripper to realize the real-time control of the industrial robot.

The script uses a specific communication code to realize the communication function with the robot controller. The communication code is obtained by compiling the relevant control data according to the communication protocol of the EpsonC4 robot.

The data communication script includes a data sending module, an initialization module, and a control point judgment module. The data sending module is configured to configure communication interface parameters and send a communication code when a control point is triggered. The initialization module is configured to send an initialization communication code and a login communication code to the robot controller when the project is started. The control point judgment module is configured to be refreshed frame by frame after the project is started until it detects that the robotic gripper moves into a bounding box of a control point to trigger the data sending module to send a communication code corresponding to the control point.

Embodiment 7

Based on the real-time control system according to EMBODIMENT 6, the rigid body has a mass coefficient of 1, a resistance coefficient of 15, and an angular resistance coefficient of 25.

Embodiment 8

Based on the real-time control system according to EMBODIMENT 5, reticulate control points are equidistantly arranged in the Cyber model.

Embodiment 9

Based on the real-time control system according to EMBODIMENT 5, the real industrial robot is a six-degree-of-freedom serial industrial robot.

Embodiment 10

Based on the real-time control system according to EMBODIMENT 9, a model of the six-degree-of-freedom tandem industrial robot is EpsonC4.

Embodiment 11

Based on the real-time control system according to EMBODIMENT 1, a model of the robot controller is EpsonC4RC700.

What is claimed is:

1. A real-time control system for an industrial robot based on virtual reality (VR), comprising:
a VR integrated machine;
a model construction module;
a motion control module;
a data communication system; and
a robot controller;
wherein the VR integrated machine comprises a VR headset and a VR controller;
the model construction module is configured to construct an industrial robot model and a workspace model of the industrial robot;
the motion control module is configured to construct a Cyber model corresponding to the industrial robot model and the workspace model of the industrial robot; arrange a plurality of control points in the Cyber model, and set a first bounding box for each of the plurality of control points such that first bounding box respectively corresponding to the plurality of control points cover an entire workspace of the industrial robot in the Cyber model;
set a second bounding box and a VR interactive component that displays a highlighted and grasp option on a gripper of the industrial robot in the Cyber model, and associate the VR interactive component with the VR controller;
set a camera component in the Cyber model, and associate the camera component with the VR headset; and
receive a trigger signal sent by the VR controller and send a corresponding motion command;
the VR headset is configured to image the industrial robot and the Cyber model in the VR headset through the camera component when the VR headset is turned on to enter a working mode;
the VR controller is configured to touch the second bounding box when the VR headset enters the working mode to activate the highlighted and grasp option in the VR interactive component, so as to drag the gripper of the industrial robot in the Cyber model to move to a certain control point in the workspace of the industrial robot, and send a corresponding trigger signal to the motion control module; and
the robot controller is configured to preset a plurality of control data; motion commands of the plurality of control points respectively corresponds to the plurality of control data; and when the data communication system receives a motion command sent by the motion control module, the industrial robot is controlled to move by a control data corresponding to the motion command; and
the robot controller is also configured to set a plurality of mesh control points at an equal interval in the Cyber model.

2. The real-time control system of claim 1, wherein the model construction module further comprises a display module; and the display module is configured to display a real-time movement position information of the industrial robot in the VR headset.

3. The real-time control system of claim 1, wherein the data communication system comprises a data sending module, an initialization module and a control point judgment module;
the data sending module is configured to send a communication code when receiving a signal that a control point is triggered;
the initialization module is configured to send a login communication code command when receiving the signal that a control point is triggered;
the control point judgment module is configured to receive the login communication code command, scan the plurality of control points until detecting that the gripper of the industrial robot moves into a bounding box of a control point and send a communication code corresponding to the control point; and
the data sending module is configured to send the communication code corresponding to the control point to the robot controller to trigger a control data corresponding to the control point such that the robot controller controls the industrial robot to move according to the control data.

4. The real-time control system of claim 1, wherein each of the plurality of control data comprises a control point coordinate, a movement speed of the industrial robot, a movement acceleration of the industrial robot, and a movement mode of the industrial robot.

5. The real-time control system of claim 1, wherein the model construction module comprises an industrial robot drawing unit, a three-dimensional (3D) model construction unit, and a workspace construction unit;
the industrial robot drawing unit is configured to draw geometric features of the industrial robot using a Solidworks software to obtain an industrial robot drawing, and import the industrial robot drawing into the 3D model construction unit;
the 3D model construction unit is configured to create a 3D image of the industrial robot based on the industrial robot drawing to render a surface material of the 3D image identical to that of the industrial robot; and adjust a center of each joint axis of the 3D image of the industrial robot to obtain an adjusted 3D model as an industrial robot model; and
the workspace construction unit is configured to construct a workspace model of the industrial robot according to a physical workspace of the industrial robot.

6. The real-time control system of claim 5, wherein in the motion control module, the Cyber model is constructed by using a Cyber model construction unit;
the Cyber model construction unit is configured to construct an empty Cyber model using an Unity3D engine; import the industrial robot model and the workspace model of the industrial robot into the empty Cyber model to form the Cyber model; and introduce a rigid body and a hinge component to each joint axis of the industrial robot in the Cyber model to render a motion of the industrial robot in the Cyber model consistent with that of the industrial robot in a real space.

7. The real-time control system of claim 6, wherein the rigid body has a mass coefficient of 1, a resistance coefficient of 15, and an angular resistance coefficient of 25.

8. The real-time control system of claim 5, wherein the industrial robot is a six-degree-of-freedom serial industrial robot.

9. The real-time control system of claim 8, wherein a model of the six-degree-of-freedom tandem industrial robot is EpsonC4.

10. The real-time control system of claim 1, wherein a model of the robot controller is EpsonC4RC700.

\* \* \* \* \*